United States Patent
Jang

(10) Patent No.: US 10,120,432 B2
(45) Date of Patent: Nov. 6, 2018

(54) TOUCH SENSING SYSTEM AND METHOD OF CONTROLLING POWER CONSUMPTION THEREOF

(71) Applicant: LG DISPLAY CO., LTD., Seoul (KR)

(72) Inventor: Kyungjin Jang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/096,016

(22) Filed: Apr. 11, 2016

(65) Prior Publication Data

US 2016/0224095 A1 Aug. 4, 2016

Related U.S. Application Data

(63) Continuation of application No. 14/075,016, filed on Nov. 8, 2013, now Pat. No. 9,329,739.

(30) Foreign Application Priority Data

Nov. 13, 2012 (KR) .................. 10-2012-0128034

(51) Int. Cl.
| | |
|---|---|
| G06F 3/045 | (2006.01) |
| G06F 1/32 | (2006.01) |
| G06F 3/044 | (2006.01) |
| G06F 3/041 | (2006.01) |
| G06F 3/05 | (2006.01) |

(52) U.S. Cl.
CPC ............ *G06F 1/3262* (2013.01); *G06F 3/044* (2013.01); *G06F 3/0416* (2013.01); *G06F 3/05* (2013.01); *Y02D 50/20* (2018.01)

(58) Field of Classification Search
CPC ...... G06F 1/3262; G06F 3/0416; G06F 3/044; G06F 3/05; Y02B 60/32
USPC .................................................. 345/173–174
See application file for complete search history.

(56) References Cited

U.S. PATENT DOCUMENTS

| | | | | |
|---|---|---|---|---|
| 2008/0309631 A1* | 12/2008 | Westerman | ........... | G06F 1/3203 345/173 |
| 2010/0156839 A1* | 6/2010 | Ellis | ....................... | G06F 1/3203 345/174 |
| 2011/0001492 A1* | 1/2011 | Nys | ........................ | H03M 1/123 324/658 |
| 2011/0248950 A1* | 10/2011 | Yang | ....................... | G06F 3/045 345/174 |
| 2012/0154537 A1* | 6/2012 | Chang | .................. | H04N 5/2256 348/46 |

(Continued)

*Primary Examiner* — Nicholas Lee
*Assistant Examiner* — Ngan T Pham Lu
(74) *Attorney, Agent, or Firm* — Morgan, Lewis & Bockius LLP

(57) ABSTRACT

A touch sensing system and a method of controlling power consumption thereof are disclosed. The touch sensing system includes a plurality of sensing units, which sample a voltage received from a touch screen and accumulate the sampled voltage, and a plurality of analog-to-digital converters converting an output of the sensing units into digital data. The sensing units and the analog-to-digital converters are divided into a plurality of groups in an idle state. Each of the plurality of groups includes at least two sensing units and one analog-to-digital converter. At least one sensing unit included in at least one group is powered down in the idle state. An analog-to-digital converter is powered on during the group it belongs to is powered on.

50 Claims, 8 Drawing Sheets

(56) References Cited

U.S. PATENT DOCUMENTS

2013/0141363 A1\* 6/2013 Hung ................... G06F 3/0488
345/173

\* cited by examiner

TOUCH SENSING SYSTEM AND METHOD OF CONTROLLING POWER CONSUMPTION THEREOF

CROSS REFERENCE TO RELATED APPLICATION

This is a Continuation of U.S. patent application Ser. No. 14/075,016, filed on Nov. 8, 2013, which, claims the benefit of Korean Patent Application No. 10-2012-0128034 filed on Nov. 13, 2012, the entire contents of which is incorporated herein by reference for all purposes as if fully set forth herein.

BACKGROUND OF THE INVENTION

Field of the Invention

Embodiments of the invention relate to a touch sensing system and a method of controlling power consumption thereof.

Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technologies have continuously expanded to increase user's sensibility and handling convenience. The user interface has been recently developed to include touch UI, voice recognition UI, 3D UI, etc.

The touch UI has been used in portable information appliances and has been expanded to the use of home appliances. A capacitive touch sensing system includes a capacitive touch screen which has durability and definition better than an existing resistive touch screen and is able to recognize a multi-touch input and a proximity touch input. Hence, the capacitive touch sensing system may be applied to various applications. In the touch sensing system, a touch report rate has to increase so as to increase the touch sensitivity a user feels and to accurately recognize a touch input or a dragging trace. The touch report rate is a velocity or a frequency, at which coordinate information of touch data obtained by sensing touch sensors present in the touch screen is transmitted to an external host system.

The capacitive touch sensing system includes a readout integrated circuit (ROIC) and a microcontroller unit (MCU). A touch integrated circuit (IC) is an IC obtained by integrating the ROIC and the MCU into one package. The ROIC includes a driving unit and a sensing unit. The driving unit supplies a driving signal to the touch sensors through lines formed on the touch screen. The sensing unit senses voltages of the touch sensors and detects an amount of changes in the voltages of the touch sensors before and after a touch input. The sensing unit then converts the amount of changes in the voltages into digital data using an analog-to-digital converter (ADC). The MCU analyzes touch raw data converted into the digital data and decides whether or not the touch input is generated. The MCU calculates position coordinates of the touch input.

Because the size of a touch screen used in display devices of small-sized information appliances such as mobile phones and tablet PCs is small, the number of sensing units included in an ROIC of the small-sized touch screen is not many. In the small-sized touch screen, power consumption may be reduced by reducing a driving velocity in an idle state.

A touch screen used in display devices of medium and large-sized information appliances, such as notebook computers, desktop computers, and public displays, includes a large number of touch sensors (or sensor nodes). Because the long lines are used in the medium and large-sized touch screen, a delay of the driving signal increases. Hence, a driving performance and a sensing velocity are reduced. The touch report rate is required to increase so as to increase the touch sensitivity of the user in the medium and large-sized touch screen. A touch sensing system for driving the medium and large-sized touch screen includes a large number of driving units and sensing units of an ROIC. Thus, it is difficult to sufficiently reduce power consumption of the medium and large-sized touch screen using the same method as the small-sized touch screen, i.e., the method for reducing the driving velocity.

SUMMARY OF THE INVENTION

Embodiments of the invention provide a touch sensing system and a method of controlling power consumption thereof capable of greatly reducing the power consumption in an idle mode.

In one aspect, there is a touch sensing system including a plurality of sensing units, which sample a voltage received from a touch screen and accumulate the sampled voltage, and a plurality of analog-to-digital converters converting an output of the sensing units into digital data.

The sensing units and the analog-to-digital converters are divided into a plurality of groups in an idle state. Each of the plurality of groups includes at least two sensing units and one analog-to-digital converter.

At least one sensing unit included in at least one group is powered down in the idle state and an analog-to-digital converter is powered on during the group it belongs to is powered on.

In another aspect, there is a method of controlling power consumption of the touch sensing system including dividing the sensing units and the analog-to-digital converters into a plurality of groups in the idle state, and powering down at least one sensing units included in at least one group in the idle state, wherein an analog-to-digital converter is powered on during the group it belongs to is powered on.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

A display device according to an example embodiment of the invention may be implemented based on a flat panel display, such as a liquid crystal display (LCD), a field emission display (FED), a plasma display panel (PDP), an organic light emitting diode (OLED) display, and an electrophoresis display (EPD). In the following description, the embodiment of the invention will be described using the liquid crystal display as an example of the flat panel display. Other flat panel displays may be used.

A touch sensing system according to the embodiment of the invention includes a touch screen which is disposed on a display panel of the display device or is embedded in the display panel. The touch screen according to the embodiment of the invention may be implemented as a capacitive touch screen which senses a touch input through a plurality of capacitive sensors. The capacitive touch screen includes a plurality of touch sensors. Each of the touch sensors has a capacitance when viewed through an equivalent circuit. The capacitance may be divided into a self capacitance and a mutual capacitance. The self capacitance is formed along conductor lines of a single layer formed in one direction. The mutual capacitance is formed between two conductor lines perpendicular to each other. In the following description, a mutual capacitive touch screen will be described as an example of the capacitive touch screen. Other types of capacitive touch screens may be used.

Figure 1:
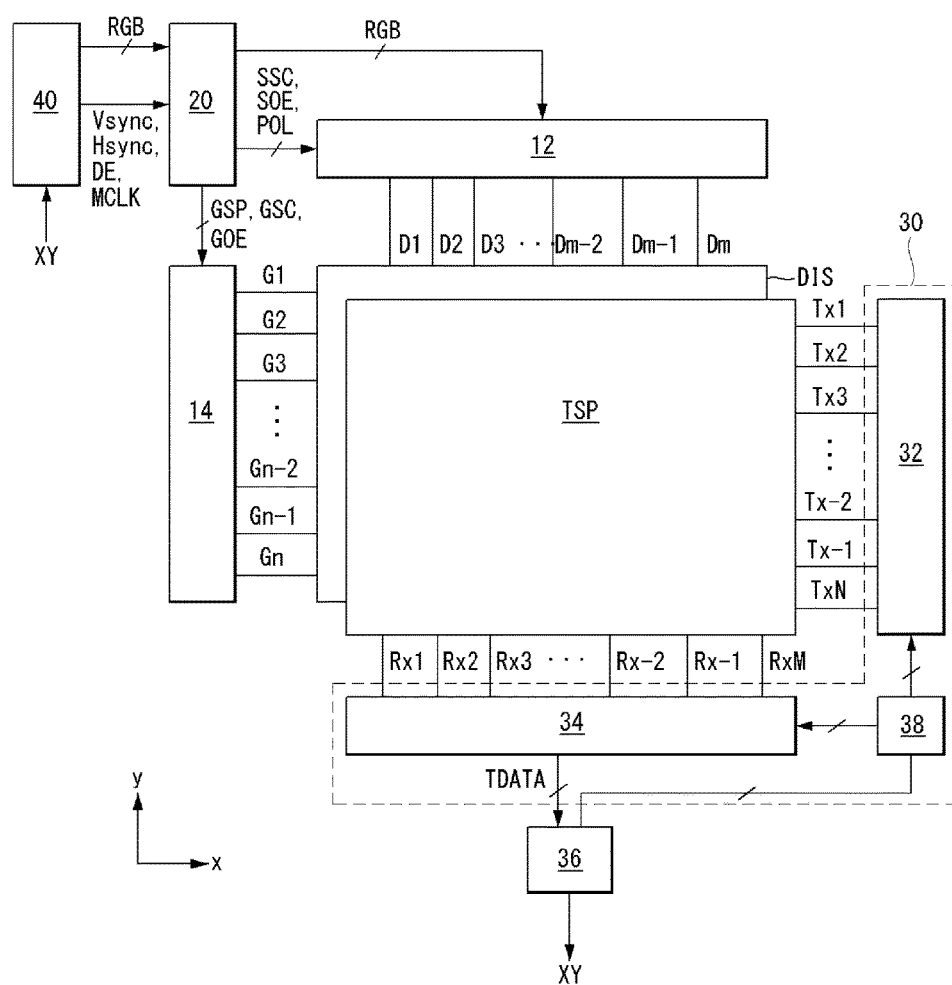
FIG. 1 illustrates a touch sensing system according to an example embodiment of the invention.
Figure 2:
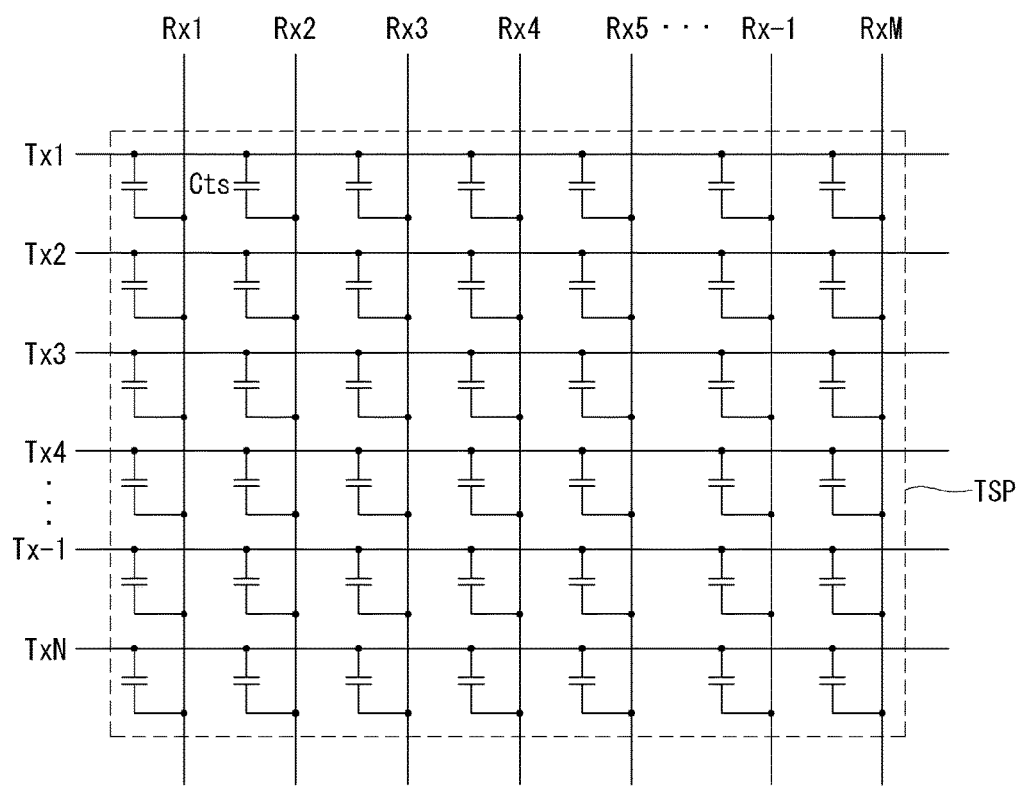
FIG. 2 is an equivalent circuit diagram of a touch screen shown in FIG. 1.
Figure 3:
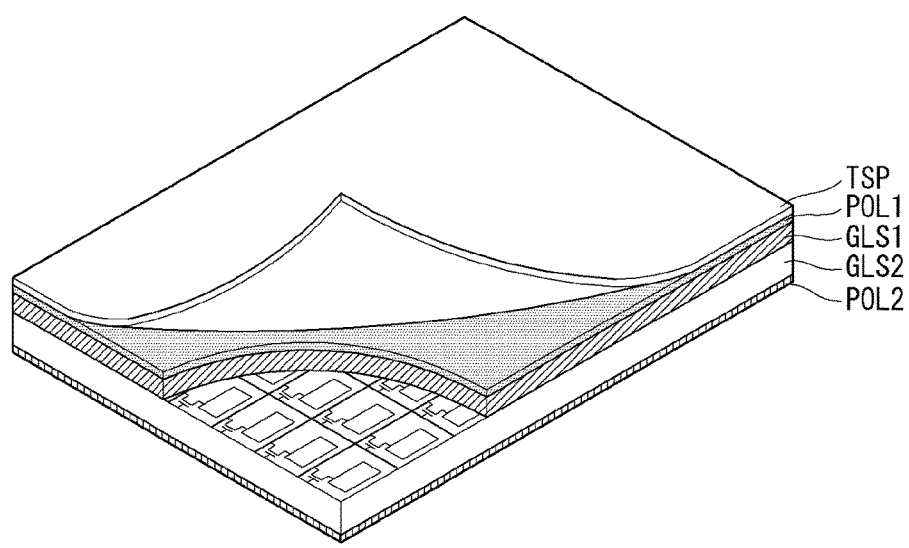
FIGS. 3 to 5 illustrate various combinations of a touch screen and a display panel according to an example embodiment of the invention.
Figure 4:
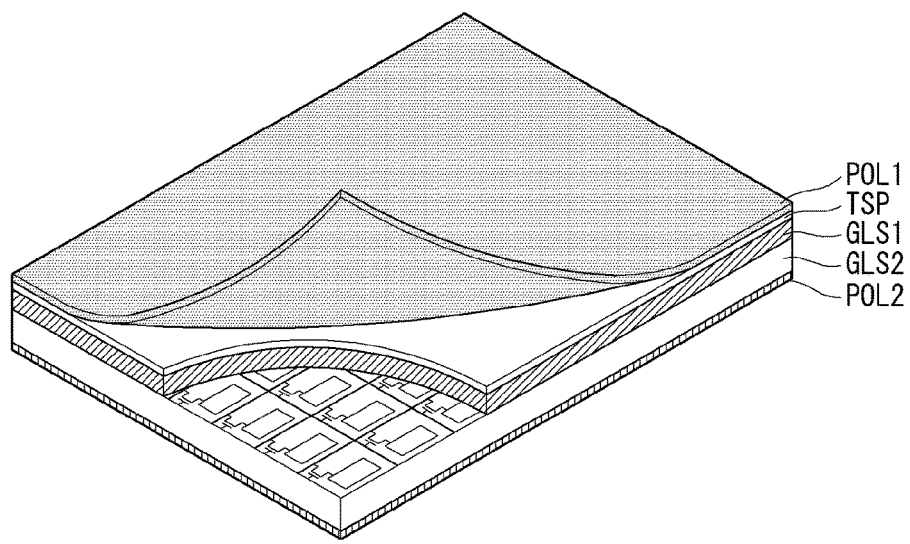
Figure 5:
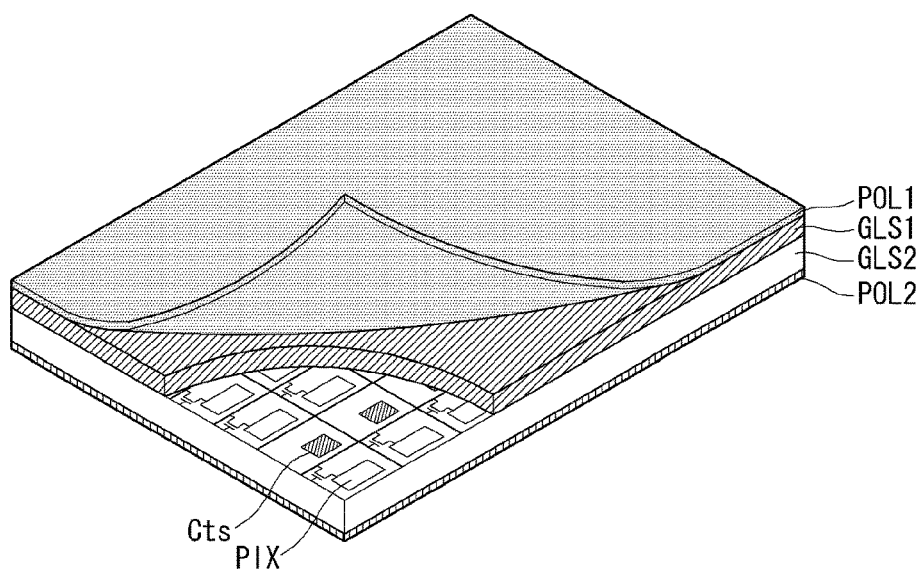

As shown in FIGS. 1 to 5, the touch sensing system according to the embodiment of the invention includes a touch screen TSP, a touch screen driving circuit, etc. As shown in FIG. 3, the touch screen TSP may be attached on an upper polarizing plate POL1 of a display panel DIS. Alternatively, as shown in FIG. 4, the touch screen TSP may be formed between the upper polarizing plate POL1 and an upper substrate GLS1 of the display panel DIS. Alternatively, as shown in FIG. 5, touch sensors Cts of the touch screen TSP may be formed on a lower substrate GLS2 of the display panel DIS along with a pixel array of the display panel DIS in an in-cell type. In FIGS. 3 to 5, 'PIX' denotes a pixel electrode of a liquid crystal cell.

The display panel DIS includes the lower substrate GLS2, the upper substrate GLS1, and a liquid crystal layer formed between the lower substrate GLS2 and the upper substrate GLS1. The pixel array of the display panel DIS includes a plurality of pixels formed in pixel areas defined by data lines D1 to Dm and gate lines (or scan lines) G1 to Gn, where m and n are a positive integer. Each of the pixels includes a plurality of thin film transistors (TFTs) formed at crossings of the data lines D1 to Dm and the gate lines G1 to Gn, a pixel electrode for charging a liquid crystal cell to a data voltage, a storage capacitor which is connected to the pixel electrode and holds a voltage of the liquid crystal cell, etc.

Black matrixes, color filters, etc. are formed on the upper substrate GLS1 of the display panel DIS. The lower substrate GLS2 of the display panel DIS may be configured in a COT (color filter on TFT) structure. In this instance, the color filters may be formed on the lower substrate GLS2 of the display panel DIS. Common electrodes, to which a common voltage is supplied, may be formed on the upper substrate GLS1 or the lower substrate GLS2 of the display panel DIS. Polarizing plates POL1 and POL2 are respectively attached to the upper and lower substrates GLS1 and GLS2 of the display panel DIS. Alignment layers for setting a pre-tilt angle of liquid crystals are respectively formed on the inner surfaces contacting the liquid crystals in the upper and lower substrates GLS1 and GLS2 of the display panel DIS. A column spacer may be formed between the upper and lower substrates GLS1 and GLS2 of the display panel DIS to keep cell gaps of the liquid crystal cells constant.

A backlight unit may be disposed under a back surface of the display panel DIS. The backlight unit may be configured as one of an edge type backlight unit and a direct type backlight unit to provide light to the display panel DIS. The display panel DIS may be implemented in any known mode including a twisted nematic (TN) mode, a vertical alignment (VA) mode, an in-plane switching (IPS) mode, a fringe field switching (FFS) mode, etc.

A display driving circuit includes a data driving circuit 12, a scan driving circuit 14, and a timing controller 20. The touch screen driving circuit applies a video data voltage of an input image to the pixels of the display panel DIS. The data driving circuit 12 converts digital video data RGB received from the timing controller 20 into positive and negative analog gamma compensation voltages and outputs the data voltage. The data driving circuit 12 then supplies the data voltage to the data lines D1 to Dm. The scan driving circuit 14 sequentially supplies a gate pulse (or scan pulse) synchronized with the data voltage to the gate lines G1 to Gn and selects lines of the display panel DIS to which the data voltage will be applied.

The timing controller 20 receives timing signals, such as a vertical sync signal Vsync, a horizontal sync signal Hsync, a data enable DE, and a main clock MCLK, from a host system 40. The timing controller 20 generates a data timing control signal and a scan timing control signal for respectively controlling operation timings of the data driving circuit 12 and the scan driving circuit 14 using the timing signals. The data timing control signal includes a source sampling clock SSC, a source output enable SOE, a polarity control signal POL, etc. The scan timing control signal includes a gate start pulse GSP, a gate shift clock GSC, a gate output enable GOE, etc.

The touch screen TSP includes Tx lines Tx1 to TxN, where N is a positive integer, Rx lines Rx1 to RxM crossing the Tx lines Tx1 to TxN, where M is a positive integer, and MxN touch sensors Cts formed at crossings of the Tx lines Tx1 to TxN and the Rx lines Rx1 to RxM. Each of the touch sensors Cts has a mutual capacitance.

A touch screen driving circuit includes a readout integrated circuit (ROIC) 30 and a microcontroller unit (MCU) 36. The MCU 36 is an external controller which controls the ROIC 30, analyzes touch raw data received from the ROIC 30, and calculates a coordinate of each of touch input positions. The touch IC supplies a driving signal to the touch sensors Cts of the touch screen TSP and detects an amount of changes in voltages of the touch sensors Cts before and after a touch input. The touch IC converts the amount of changes in the voltages of the touch sensors Cts before and after the touch input into digital data to generate touch raw data TDATA. The touch IC analyzes the touch raw data TDATA and calculates a coordinate of each of the touch input positions.

Figure 6:
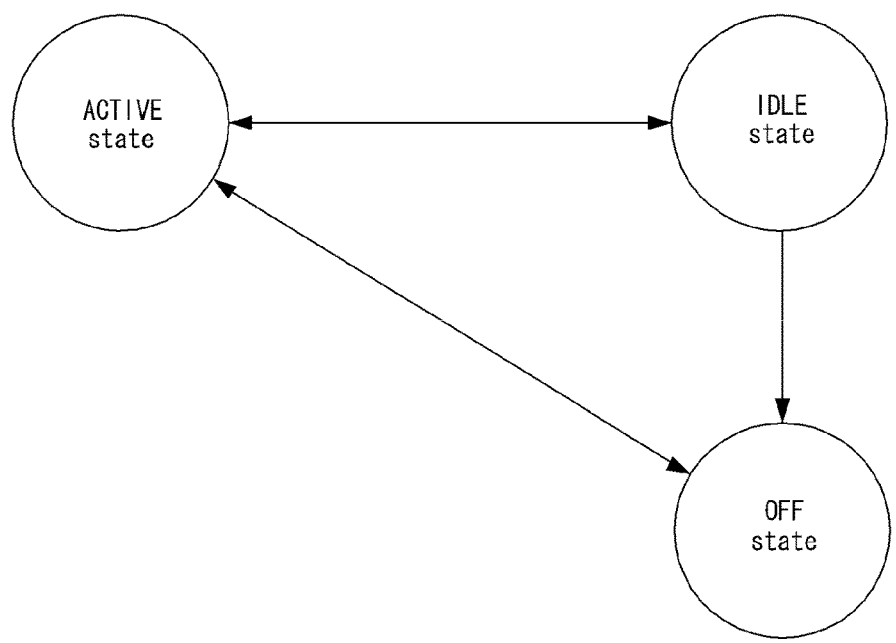
FIG. 6 illustrates changes in an operation state of a touch sensing system.

As shown in FIG. 6, when the touch input is generated in a cycle less than a predetermined period of time, the touch IC operates in an active state and thus is driven at a high speed. The touch IC then transmits a coordinate of a touch input position to the host system 40 at a high touch report rate. Because both the ROIC 30 and the MCU 36 operate in the active state, power consumption of the touch IC in the active state is relatively high. When the touch input is not generated for at least a predetermined period of time, the touch IC operates in an idle state. In the idle state, the touch IC drives only an interrupt receiving circuit of the MCU 36 and drives only a minimum number of sensing units of the ROIC 30, thereby deciding whether or not the touch input is generated. In the idle state, the touch IC decides only whether or not the touch input is generated and does not calculate the coordinate of the touch input position. In the idle state, power consumption of the MCU 36 is little, and power consumption of the ROIC 30 is greatly reduced because the minimum number of sensing units is powered on. When the driving power of the touch IC is cut off, an operation state of the touch IC is changed to an off-state, in which the ROIC 30 and the MCU 36 do not operate. Hence, the touch IC cannot decide whether or not the touch input is generated, and there is no power consumed in the touch IC. When the driving power is again supplied to the touch IC, the touch IC is initialized and then operates in the active state. As shown in FIGS. 7 to 10, the touch sensing system according to the embodiment of the invention virtually divides the sensing units and analog-to-digital converters (ADCs) of the ROIC 30 into at least two groups and sequentially drives the at least two groups on a per group basis in the idle state, so as to prevent or reduce a reduction in the touch sensitivity while greatly reducing the power consumption in the idle state.

The ROIC 30 includes the plurality of sensing units, which sample the voltages received from the touch screen TSP and accumulate the sampled voltages, and the plurality of ADCs converting an output of the sensing units into digital data. In the idle state, the sensing units and the ADCs of the ROIC 30 are divided into a plurality of groups. Each of the groups includes at least two sensing units and one ADC. The groups are sequentially powered on in the idle state. The at least two sensing units belonging to each group are sequentially powered on in the idle state.

For example, when the ROIC 30 is divided into two groups in the idle state, a first group includes first and third sensing units and a first ADC which converts an output of the first and third sensing units into the digital data to generate the touch raw data. A second group includes second and fourth sensing units and a second ADC which converts an output of the second and fourth sensing units into the digital data to generate the touch raw data. In the idle state, after the first sensing unit and the first ADC of the first group are powered on, the second sensing unit and the second ADC of the second group are powered on. Subsequently, after the third sensing unit and the first ADC of the first group are powered on, the fourth sensing unit and the second ADC of the second group are powered on.

The host system 40 may be implemented as one of a television system, a set-top box, a navigation system, a DVD player, a Blu-ray player, a personal computer (PC), a home theater system, and a phone system. The host system 40 includes a system on chip (SoC), in which a scaler is embedded, and thus converts the digital video data RGB of an input image into a format suitable for displaying on the display panel DIS. The host system 40 transmits the digital video data RGB and the timing signals Vsync, Hsync, DE, and MCLK to the timing controller 20. Further, the host system 40 runs an application associated with coordinate information XY of touch data received from the MCU 36.

The ROIC 30 includes a Tx driving circuit 32, an Rx driving circuit 34, a timing generator 38, etc.

The ROIC 30 applies the driving signal to the touch sensors Cts through the Tx lines Tx1 to TxN using the Tx driving circuit 32 and senses the voltages of the touch sensors Cts in synchronization with the driving signal through the Rx lines Rx1 to RxM and the Rx driving circuit 34 to output the touch raw data, which is the digital data. The driving signal may be generated various forms such as a pulse, a sine wave, and a triangle wave.

In a normal operation mode, the Tx driving circuit 32 selects a Tx channel, to which the driving signal will be output, in response to a Tx setup signal from the timing generator 38 and applies the driving signal to the Tx lines Tx1 to TxN connected to the selected Tx channel. Charges are supplied to the touch sensors Cts during a high potential period of the driving signal. The voltages of the touch sensors Cts may be accumulated in a capacitor of an integrator embedded in the Rx driving circuit 34 in response to each driving signal. For this, the driving signal may be successively supplied to each of the Tx lines Tx1 to TxN two or more times.

Figure 9:
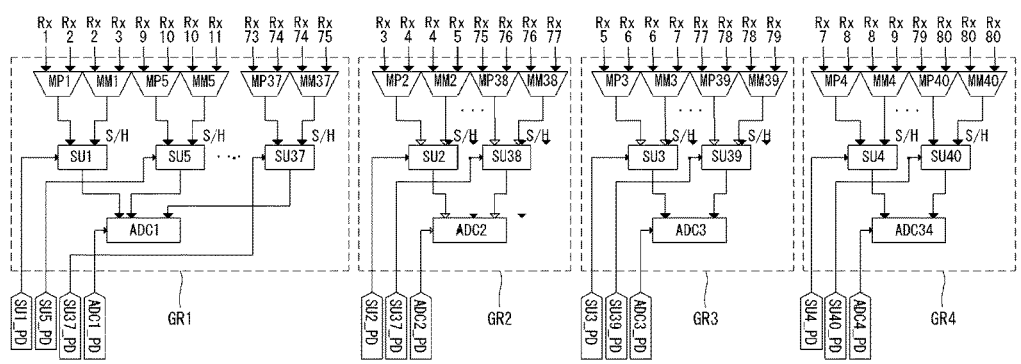
FIGS. 9 and 10 illustrate examples of dividing an ROIC shown in FIG. 8 into a plurality of groups.
Figure 10:
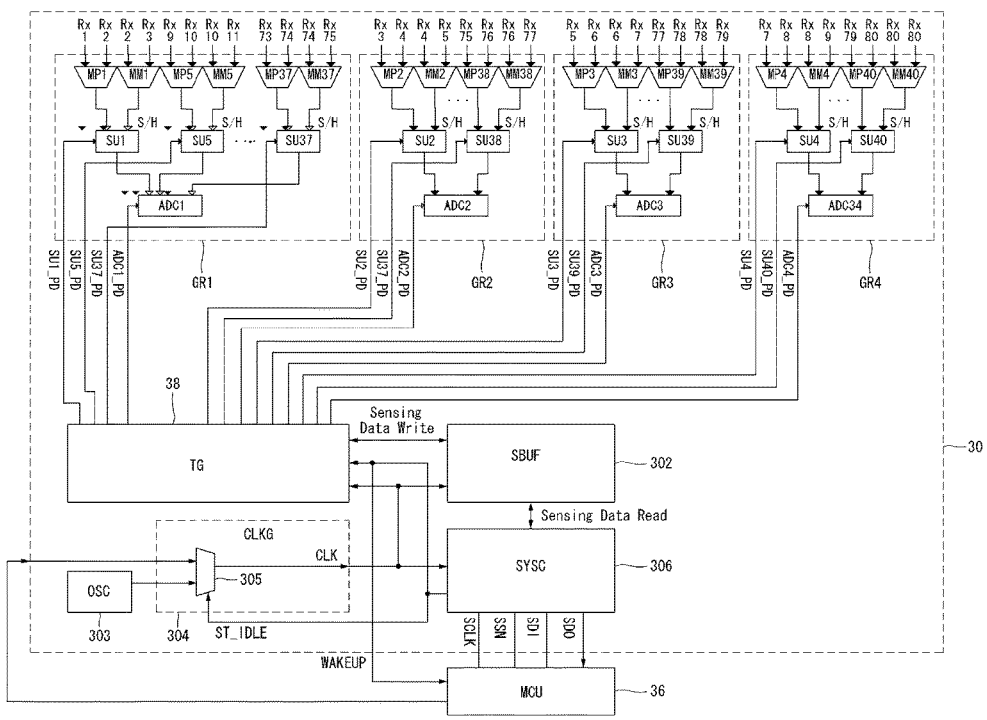

The Rx driving circuit 34 selects the Rx lines to receive the voltages of the touch sensors Cts in response to an Rx setup signal from the timing generator 38. Each of the sensing units includes a sample and hold circuit and an integrator. The sample and hold circuit samples the voltage of the touch sensor received through Rx lines Rx(i) and Rx(i+1) and accumulates the sampled voltage of the touch sensor in a capacitor of the integrator. Further, the sample and hold circuit holds the voltage of the capacitor under the control of the timing generator 38 and supplies the hold voltage to the ADC. The ADC converts an analog signal accumulated in the integrator into digital data in conformity with a clock timing of the clock CLK to output the touch raw data. As shown in FIGS. 9 and 10, a multiplexer may be installed between the Rx lines and the sensing units. The multiplexer may be omitted, if necessary or desired.

Figure 7:
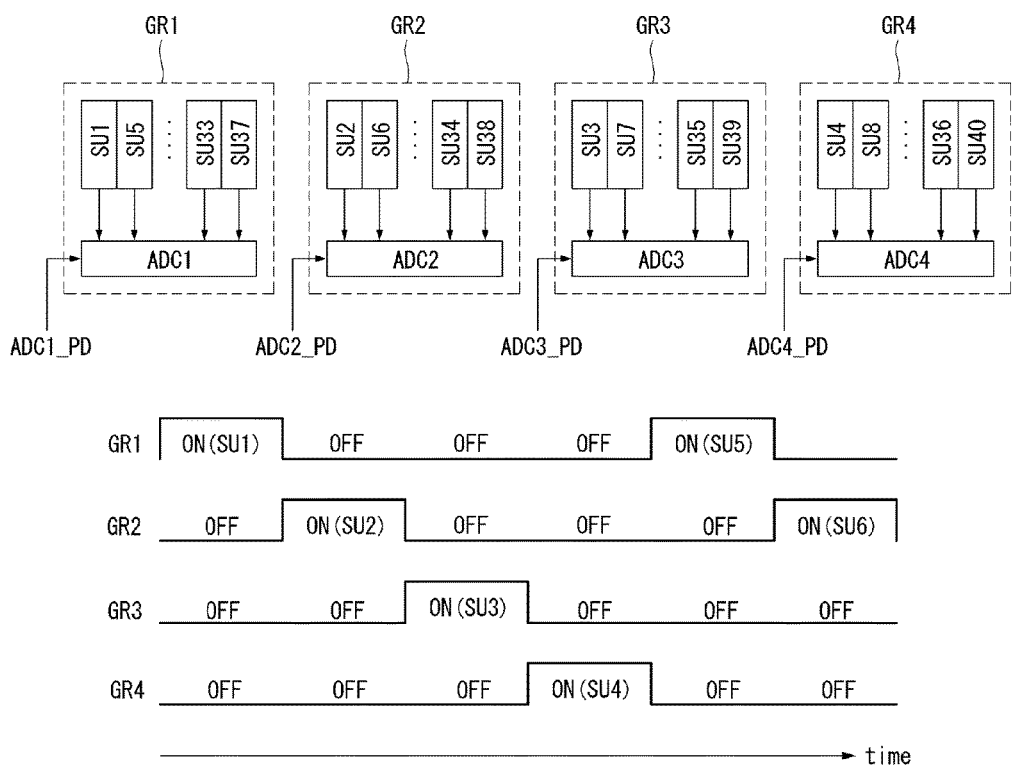
FIG. 7 illustrates an example of dividing a readout integrated circuit (ROIC) into a plurality of groups in an idle state to sequentially drive the ROIC on a per group basis.
Figure 8:
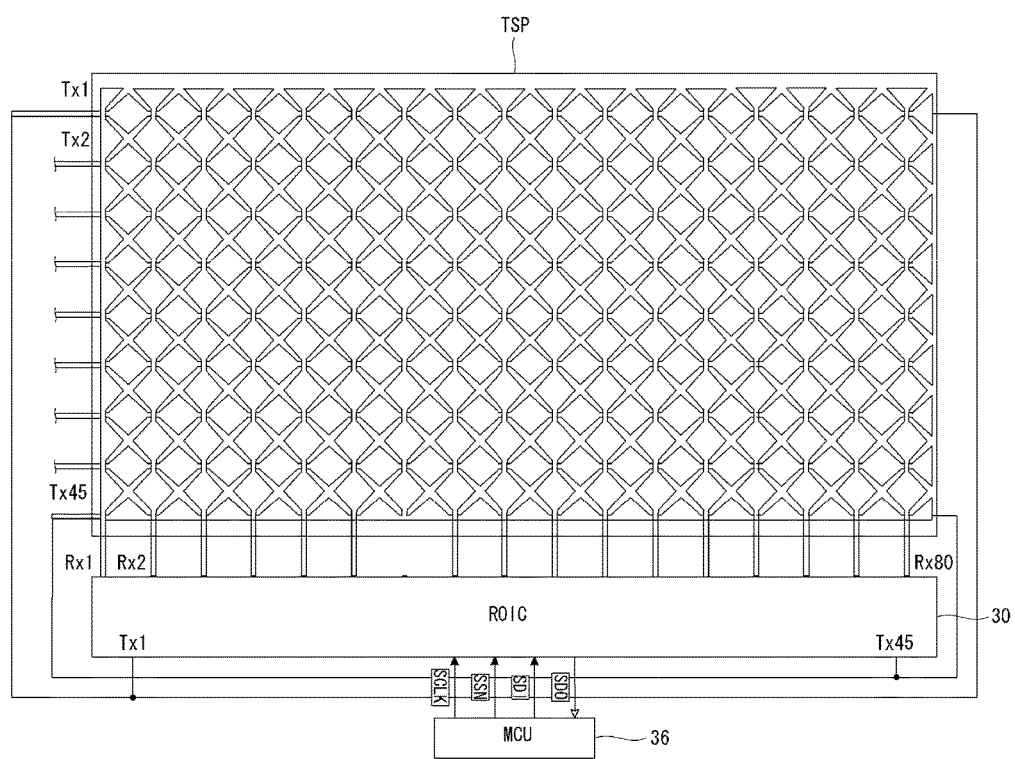
FIG. 8 illustrates an ROIC and a microcontroller unit (MCU) connected to a touch screen of 45×80 size.

FIG. 7 illustrates an example of dividing the ROIC 30 into a plurality of groups in the idle state to sequentially drive the ROIC 30 on a per group basis. In FIG. 7, it is assumed that the number of channels connected to the ROIC 30 is 40. FIG. 8 illustrates the ROIC 30 and the MCU 36 connected to the touch screen TSP of 45 (indicating the number of Tx channels)×80 (indicating the number of Rx channels) size. In FIG. 8, the ROIC 30 and the MCU 36 are connected to each other through, for example, a serial peripheral interface (SPI) including SPI serial clock (SCLK), SSN (serial select (active low)), serial data input (SDI), and serial data output (SDO). However, the embodiment of the invention is not limited thereto. For example, the ROIC 30 and the MCU 36 may transmit and receive data through an interface such as SPI, universal serial bus (USB), and I²C. FIGS. 9 and 10 illustrate examples of dividing the ROIC 30 shown in FIG. 8 into a plurality of groups. The Tx driving circuit 32 of the ROIC 30 is omitted in FIGS. 9 and 10.

As shown in FIGS. 7 to 10, the ROIC 30 is divided into at least two groups (for example, four groups GR1 to GR4) in the idle state and is sequentially powered on a per group basis. Each group includes a plurality of sensing units and one ADC.

The groups GR1 to GR4 include a plurality of sensing units SU1 to SU40 and a plurality of ADCs ADC1 to ADC4.

As shown in FIG. 9, a first sensing unit SU1 of the first group GR1 may receive voltages from the first and second Rx lines Rx1 and Rx2 through a multiplexer MP1 and then may receive voltages from the second and third Rx lines Rx2 and Rx3 through a multiplexer MM1. In the example illustrated in FIG. 9, the first sensing unit SU1 of the first group GR1 amplifies a difference between the voltages received from the first and second Rx lines Rx1 and Rx2 using a differential amplifier and samples and accumulates the amplified voltage difference. Subsequently, the first sensing unit SU1 of the first group GR1 amplifies a difference between the voltages received from the second and third Rx lines Rx2 and Rx3 using the differential amplifier and samples and accumulates the amplified voltage difference. The differential amplifier may be implemented as a fully differential amplifier which amplifies a difference between the voltages obtained from the adjacent touch sensors through a positive output terminal and a negative output terminal and outputs voltages of positive and negative signals having a complementary relation. As shown in FIG. 9, a second sensing unit SU5 of the first group GR1 may receive voltages from the ninth and tenth Rx lines Rx9 and Rx10 through a multiplexer MP5 and then may receive a voltages from the tenth and eleventh Rx lines Rx10 and Rx11 through a multiplexer MM5. In the example illustrated in FIG. 9, the second sensing unit SU5 of the first group GR1 amplifies a difference between the voltages received from the ninth and tenth Rx lines Rx9 and Rx10 using a differential amplifier and samples and accumulates the amplified voltage difference. Subsequently, the second sensing unit SU5 of the first group GR1 amplifies a difference between the voltages received from the tenth and eleventh Rx lines Rx10 and Rx11 using the differential amplifier and samples and accumulates the amplified voltage difference. The multiplexers and the differential amplifiers are configured so that they reduce the number of sensing units and reduce a noise of the received signal. Alternatively, the multiplexers and the differential amplifiers may be omitted if necessary or desired. In this instance, the first sensing unit SU1 of the first group GR1 may receive the voltage from the first Rx line Rx1, and the second sensing unit SU5 of the first group GR1 may receive the voltage from the fifth Rx line Rx5.

As shown in FIG. 9, a first sensing unit SU2 of the second group GR2 may receive voltages from the third and fourth Rx lines Rx3 and Rx4 through a multiplexer MP2 and then may receive voltages from the fourth and fifth Rx lines Rx4 and Rx5 through a multiplexer MM2. In the example illustrated in FIG. 9, the first sensing unit SU2 of the second group GR2 amplifies a difference between the voltages received from the third and fourth Rx lines Rx3 and Rx4 using a differential amplifier and samples and accumulates the amplified voltage difference. Subsequently, the first sensing unit SU2 of the second group GR2 amplifies a difference between the voltages received from the fourth and fifth Rx lines Rx4 and Rx5 using the differential amplifier and samples and accumulates the amplified voltage difference. If the multiplexers and the differential amplifier are omitted, the first sensing unit SU2 of the second group GR2 may receive the voltage from the second Rx line Rx2.

As shown in FIG. 9, a first sensing unit SU3 of the third group GR3 may receive voltages from the fifth and sixth Rx lines Rx5 and Rx6 through a multiplexer MP3 and then may receive voltages from the sixth and seventh Rx lines Rx6 and Rx7 through a multiplexer MM3. In the example illustrated in FIG. 9, the first sensing unit SU3 of the third group GR3 amplifies a difference between the voltages received from the fifth and sixth Rx lines Rx5 and Rx6 using a differential amplifier and samples and accumulates the amplified voltage difference. Subsequently, the first sensing unit SU3 of the third group GR3 amplifies a difference between the voltages received from the sixth and seventh Rx lines Rx6 and Rx7 using the differential amplifier and samples and accumulates the amplified voltage difference. If the multiplexers and the differential amplifier are omitted, the first sensing unit SU3 of the third group GR3 may receive the voltage from the third Rx line Rx3.

FIGS. 9 and 10 illustrate just one example of a relationship between the sensing units and the Rx lines. Thus, other relationships may be used.

As shown in FIG. 9, a first sensing unit SU4 of the fourth group GR4 may receive voltages from the seventh and eighth Rx lines Rx7 and Rx8 through a multiplexer MP4 and then may receive voltages from the eighth and ninth Rx lines Rx8 and Rx9 through a multiplexer MM4. In the example illustrated in FIG. 9, the first sensing unit SU4 of the fourth group GR4 amplifies a difference between the voltages received from the seventh and eighth Rx lines Rx7 and Rx8 using a differential amplifier and samples and accumulates the amplified voltage difference. Subsequently, the first sensing unit SU4 of the fourth group GR4 amplifies a difference between the voltages received from the eighth and ninth Rx lines Rx8 and Rx9 using the differential amplifier and samples and accumulates the amplified voltage difference. If the multiplexers and the differential amplifier are omitted, the first sensing unit SU4 of the fourth group GR4 may receive the voltage from the fourth Rx line Rx4.

In the idle state, only one of the groups GR1 to GR4 is powered on, and the other groups are not powered on because the electric power is not applied to them. Subsequently, the next group is powered on, and the other groups are not powered on because the electric power is not applied to them. In the idle state, the groups GR1 to GR4 divided from the ROIC 30 are sequentially powered on a per group basis in such a method. In the specified group, which is being powered on in the idle state, only one sensing unit and the ADC are powered on, and the other sensing units are powered down and are not driven. In a next operation timing of the specified group, only the next sensing unit and the ADC are powered on, and the other sensing units are powered down and are not driven. In the idle state, the timing generator 38 switches on or off the electric power applied to the groups GR1 to GR4 of the ROIC 30, thereby controlling on-timings and off-timings of the groups GR1 to GR4.

The embodiment of the invention may reduce the power consumption by sequentially driving the groups GR1 to GR4 of the ROIC 30 in the idle state. In addition, the embodiment of the invention may further reduce the power consumption by sequentially driving the sensing units belonging to each group in the idle state.

An operation of the ROIC 30 in an idle mode is described in stages. First, only the first group GR1 is powered on, and the other groups GR2 to GR4 are not powered on. In this instance, only the first sensing unit SU1 of the sensing units SU1, SU5, . . . , SU33, and SU37 and the ADC ADC1 belonging to the first group GR1 are powered on, and the other sensing units SU5, . . . , SU33, and SU37 are not powered on.

Subsequently, only the second group GR2 is powered on, and the other groups GR1, GR3, and GR4 are not powered on. In this instance, only the first sensing unit SU2 of the sensing units SU2, SU6, . . . , SU34, and SU38 and the ADC ADC2 belonging to the second group GR2 are powered on, and the other sensing units SU6, . . . , SU34, and SU38 are not powered on.

Subsequently, only the third group GR3 is powered on, and the other groups GR1, GR2, and GR4 are not powered on. In this instance, only the first sensing unit SU3 of the sensing units SU3, SU7, . . . , SU35, and SU39 and the ADC ADC3 belonging to the third group GR3 are powered on, and the other sensing units SU7, . . . , SU35, and SU39 are not powered on.

Subsequently, only the fourth group GR4 is powered on, and the other groups GR1 to GR3 are not powered on. In this instance, only the first sensing unit SU4 of the sensing units SU4, SU8, . . . , SU36, and SU40 and the ADC ADC4 belonging to the fourth group GR4 are powered on, and the other sensing units SU8, . . . , SU36, and SU40 are not powered on.

Subsequently, the first group GR1 is again powered on, and the other groups GR2 to GR4 are not powered on. In this instance, only the second sensing unit SU5 of the first group GR1 and the ADC ADC1 are powered on, and the other sensing units SU1, . . . , SU33, and SU37 are not powered on.

Subsequently, the second group GR2 is again powered on, and the other groups GR1, GR3, and GR4 are not powered on. In this instance, only the second sensing unit SU6 of the second group GR2 and the ADC ADC2 are powered on, and the other sensing units SU2, . . . , SU34, and SU38 are not powered on.

When the ROIC 30 is dividedly powered on a per group basis in the idle state in such a method (for example, when the ROIC 30 is divided into the four groups and is sequentially powered on a per group basis as shown in FIG. 7), the power consumption of the ROIC 30 may be reduced to about ¼. Further, the touch input of each group is sequentially sensed, and thus a reduction in the touch sensitivity may be prevented or reduced.

The timing generator 38 controls on-timing and off-timing of the application of the electric power of the multiplexer MP1 to MM40, the sensing units SU1 to SU40, and the ADCs ADC1 to ADC4 in the idle state.

As shown in FIG. 10, the ROIC 30 further includes a buffer memory 302, a system controller 306, an inner oscillator 303, and a clock generator 304. In FIG. 10, "TG" denotes the timing generator, "SBUF" denotes the buffer memory, "OSC" denotes the inner oscillator, and "SYSC" denotes the system controller.

In the idle state, the timing generator 38 controls the drive timing of the sensing units SU1 to SU40 and the drive timing of the ADCs ADC1 to ADC4 using signals SU1_PD to SU40_PD and signals ADC1_PD to ADC4_PD. In FIG. 10, "SU1_PD to SU40_PD" denote power-down signals for controlling power-down timings of the sensing units SU1 to SU40. The sensing units, to which the power-down signals SU1_PD to SU40_PD are applied, are powered down and are not driven. Further, "ADC1_PD to ADC4_PD" denote power-down signals for controlling power-down timings of the ADCs ADC1 to ADC4. The ADCs, to which the power-down signals ADC1_PD to ADC4_PD are applied, are powered down and are not driven.

When the MCU 36 analyzes the touch raw data received from the ROIC 30 and the touch input is not generated for at least a predetermined period of time as shown in FIG. 6, the MCU 36 transmits a command to convert an operation mode of the ROIC 30 into the idle mode to the ROIC 30. Immediately after the command is generated, the MCU 36 is converted into the idle state and stops generating the clocks. The MCU 36 performs only an operation for receiving an interrupt signal WAKEUP in the idle state. In the idle state, the MCU 36 drives only an interrupt receiving circuit and shuts down circuits of the MCU 36 other than the interrupt receiving circuit. Thus, the MCU 36 little generates the power consumption in the idle state and does not decide whether or not the touch input is generated.

The system controller 306 transmits data from the MCU 36 to the timing generator 38 through an interface, for example, the SPI and reads the touch raw data stored in the buffer memory 302 to transmit the touch raw data to the MCU 36. When the system controller 306 receives a conversion instruction of the idle state from the MCU 36, the system controller 306 generates a clock selection signal ST_IDLE for converting clocks of the ROIC 30 into inner clocks. The clock selection signal ST_IDLE may be generated at a high logic level in the idle state and may be generated at a low logic level in the active state. In the idle state, the clock generator 304 selects inner clocks from the inner oscillator 303 in response to the clock selection signal ST_IDLE and transmits the inner clocks to the timing generator 38, the buffer memory 302, and the system controller 306. For this, the clock generator 304 includes a multiplexer 305 which is switched on or off in response to the clock selection signal ST_IDLE. Thus, the ROIC 30 operates based on the inner clocks in the idle state. The clock generator 304 transmits the clocks received from the MCU 36 to the timing generator 38, the buffer memory 302, and the system controller 306 in the active state.

In the idle state, when the timing generator 38 receives data equal to or greater than a predetermined threshold value from the ADCs ADC1 to ADC4, the timing generator 38 generates the interrupt signal WAKEUP and transmits the interrupt signal WAKEUP to the MCU 36. When the MCU 36 receives the interrupt signal WAKEUP, the MCU 36 is converted into the active state and thus drives all of inner circuits thereof. In the active state, the timing generator 38 of the ROIC 30 drives all the sensing units SU1 to SU40 and all the ADCs ADC1 to ADC4 and stores the touch raw data received from the ADCs ADC1 to ADC4 in the buffer memory 302. In the active state, the MCU 36 supplies the clocks for driving all the circuit components of the ROIC 30 to the ROIC 30. The MCU 36 analyzes the touch raw data received from the buffer memory 302 of the ROIC 30 to decide whether or not the touch input is generated. Further, the MCU 36 gives each of the touch input positions a label and calculates a coordinate of each of the touch input positions to generate the touch coordinate information XY.

In the active state, the interrupt signal WAKEUP may be used as a sensing data ready signal. In this instance, the MCU 36 reads the touch raw data from the buffer memory 302 in response to the sensing data ready signal which is received from the timing generator 38 through the interrupt receiving circuit.

It should be noted that, the number of the groups or the sensing unit that can be powered on at a time is not limited to that described in the above embodiments. For example, it is possible to power on two or more groups at a time or it is possible to power on two or more sensing units in the group that is powered on at a time. Furthermore, it is should also be noted that, the order of the groups and the sensing units that are powered on is not limited to those described in the above embodiments. For example, in one period, it is possible to power on GR2 first, or GR4 first, and it is also possible to power on SU5 in GR1 and then power on SU2 in GR2 and then power on SU35 in GR3, and so on.

As described above, the embodiment of the invention divides the sensing units and the ADCs into at least two groups and at least one sensing units included in at least one group is powered down in the idle state. Further, the embodiment of the invention powers on the plurality of groups in a predetermined order periodically in the idle state. As a result, the embodiment of the invention may reduce a reduction in the touch sensitivity of the touch sensing system and may greatly reduce the power consumption of the touch sensing system in the idle state.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing system, comprising:
    a plurality of sensing units configured to:
        sample a voltage received from a touch screen; and
        accumulate a sampled voltage; and
    a plurality of analog-to-digital converters configured to convert an output of the sensing units into digital data,
    wherein the sensing units and the analog-to-digital converters are divided into a plurality of groups and driven in a time division manner,
    wherein each of the plurality of groups includes:
        at least one of the sensing units, and
        at least one of the analog-to-digital converters,
    wherein one of sensing units that is included in a group other than a group that is powered on is powered down, and
    wherein the analog-to-digital converters are powered on, sequentially, on a per group basis.

2. The touch sensing system of claim 1, wherein a plurality of sensing units are connected to one analog-to-digital converter in each of the plurality of groups.

3. The touch sensing system of claim 2, wherein, among the analog-to-digital converters, only an analog-to-digital converter included in the group that is powered on is driven.

4. The touch sensing system of claim 3, wherein only the group that is powered on among the plurality of groups outputs touch raw data.

5. The touch sensing system of claim 2, wherein the sensing units connected to the one analog-to-digital converter included in the group that is powered on are driven sequentially.

6. The touch sensing system of claim 1, wherein the plurality of groups comprise:
    a first group including first and third sensing units and a first analog-to-digital converter that converts an output of the first and third sensing units into digital data to generate touch raw data; and
    a second group including second and fourth sensing units and a second analog-to-digital converter configured to convert an output of the second and fourth sensing units into digital data to generate touch raw data,
    wherein, after the first sensing unit and the first analog-to-digital converter are driven, the second sensing unit and the second analog-to-digital converter are driven, and
    wherein, subsequently, after the third sensing unit and the first analog-to-digital converter are driven, the fourth sensing unit and the second analog-to-digital converter are driven.

7. The touch sensing system of claim 1, further comprising:
    a timing generator configured to control drive timings of the sensing units and drive timings of the analog-to-digital converters;
    a buffer memory configured to store touch raw data output from the analog-to-digital converters;
    a first controller configured to:
        analyze the touch raw data in an active state; and
        calculate a coordinate of each touch input to output coordinate information;
    a second controller connected to the first controller; and
    a clock generator configured to:
        receive a first clock from an oscillator and a second external clock from the first controller; and
        transmit the first clock to the timing generator, the buffer memory, and the second controller in an idle state.

8. The touch sensing system of claim 7, wherein:
    when the touch raw data is equal to or greater than a predetermined threshold value, the timing generator is further configured to generate an interrupt signal; and
    the first controller is further configured to:
        be converted to an active state in response to the interrupt signal; and
        output coordinate information in the active state.

9. The touch sensing system of claim 8, wherein:
    the first controller comprises an interrupt receiving circuit configured to receive the interrupt signal; and
    the interrupt receiving circuit of the first controller alone is configured to be driven in the idle state so that the coordinate information is not output from the first controller.

10. The touch sensing system of claim 9, wherein the timing generator is further configured to:
    receive an operation mode command from the first controller; and
    drive the plurality of groups in a time division manner when the operation mode command indicates an idle state.

11. The touch sensing system of claim 10, wherein:
    the timing generator is further configured to:
        control power of each of the plurality of sensing units in the idle state; and
        generate a plurality of power-down signals indicating a power-down timing of each of the plurality of analog-to-digital converters; and
    the plurality of power-down signals are respectively supplied to the sensing units and the analog-to-digital converters.

12. The touch sensing system of claim 11, wherein:
    after generating the operation mode command, the first controller is converted to the idle state; and
    the first controller is further configured to turn off a power applied to circuits other than the interrupt receiving circuit.

13. The touch sensing system of claim 12, wherein the second controller is further configured to:
    transmit data received from the first controller to the timing generator;
    read the touch raw data stored in the buffer memory;
    transmit the touch raw data; and in response to receipt of an operation mode command indicating the idle state, control the clock generator by generating a clock selection signal for selecting the first clock.

14. The touch sensing system of claim 9, wherein:
the first controller is converted to the active state in response to receipt of the interrupt signal;
all the circuits in the first controller are driven in the active state; and
all the sensing units and all the analog-to-digital converters are driven in the active state under control of the timing generator.

15. The touch sensing system of claim 7, wherein the clock generator is further configured to transmit the second clock received from the first controller to the timing generator, the buffer memory, and the second controller in the active state.

16. The touch sensing system of claim 1, wherein each touch sensor of the touch screen comprises a self-capacitance type or a mutual capacitance type.

17. A touch sensitive display device, comprising:
a display driving circuit configured to:
apply video data of an input image to pixels of a display panel; and
accumulate a sampled voltage;
a plurality of sensing units configured to sample a voltage received from touch sensors coupled to the display panel; and
a plurality of analog-to-digital converters configured to convert an output of the plurality of sensing units into digital data,
wherein the sensing units and the analog-to-digital converters are divided into a plurality of groups and driven in a time division manner,
wherein each of the plurality of groups comprises:
at least one sensing unit, and
at least one analog-to-digital converter,
wherein at least one sensing unit included in a group other than a group that is powered on is powered down, and
wherein the analog-to-digital converters are powered on, sequentially, on a per group basis.

18. The touch sensitive display device of claim 17, wherein:
the touch sensors are embedded in the display panel; and
each of the touch sensors comprises a self-capacitance type or a mutual capacitance type.

19. A touch sensing system, comprising:
a plurality of sensing units configured to:
sample a voltage received from a touch screen; and
accumulate a sampled voltage;
a plurality of analog-to-digital converters configured to convert an output of the sensing units into digital data; and
a touch screen driving circuit configured to drive the sensing units and the analog-to-digital converters on a per group basis in a time division manner,
wherein each of the plurality of groups comprises:
at least one sensing unit, and
at least one analog-to-digital converter,
wherein only a group that is powered on in an idle state among a plurality of groups outputs touch raw data,
wherein the analog-to-digital converters are powered on, sequentially, on a per group basis,
wherein, when the touch raw data is equal to or greater than a predetermined threshold value, the touch screen driving circuit generates an interrupt signal to be converted to an active state, and
wherein the touch screen outputs coordinate information of a touch input only in the active state.

20. The touch sensing system of claim 19, wherein a plurality of sensing units are connected to one analog-to-digital converter in each of the plurality of groups.

21. The touch sensing system of claim 20, wherein the plurality of groups are sequentially powered on, on a per group basis, in an idle state.

22. The touch sensing system of claim 21, wherein, among the analog-to-digital converters, only an analogy-to-digital converter included in the group that is powered on is driven in an idle state.

23. The touch sensing system of claim 20, wherein the sensing units connected to the one analog-to-digital converter included in the group that is powered on is driven sequentially in an idle state.

24. The touch sensing system of claim 19, wherein:
the plurality of groups include:
a first group including first and third sensing units and a first analog-to-digital converter that converts an output of the first and third sensing units into digital data to generate touch raw data; and
a second group including second and fourth sensing units and a second analog-to-digital converter that converts an output of the second and fourth sensing units into digital data to generate touch raw data; and
after the first sensing unit and the first analog-to-digital converter are driven:
the second sensing unit and the second analog-to-digital converter are driven; and
subsequently, after the third sensing unit and the first analog-to-digital converter are driven, the fourth sensing unit and the second analog-to-digital converter are driven, in an idle state.

25. The touch sensing system of claim 19, wherein the touch screen driving circuit comprises:
a timing generator configured to control:
drive timings of the sensing units; and
drive timings of the analog-to-digital converters;
a buffer memory configured to store touch raw data output from the analog-to-digital converters;
a first controller configured to:
analyze the touch raw data in an active state; and
calculate a coordinate of each touch input to output coordinate information;
a second controller connected to the first controller; and
a clock generator configured to:
receive a first clock from an oscillator and a second external clock from the first controller; and
transmit the first clock to the timing generator, the buffer memory, and the second controller in an idle state.

26. The touch sensing system of claim 25, wherein:
when the touch raw data is equal to or greater than a predetermined threshold value, the timing generator generates an interrupt signal;
the first controller is further configured to:
be converted to an active state in response to the interrupt signal; and
output coordinate information in the active state.

27. The touch sensing system of claim 26, wherein:
the first controller comprises an interrupt receiving circuit configured to receive the interrupt signal; and
the interrupt receiving circuit of the first controller alone is driven in the idle state so that the coordinate information is not output from the first controller.

28. The touch sensing system of claim 27, wherein:
the first controller is converted to the active state in response to receipt of the interrupt signal;
all the circuits in the first controller are driven in the active state; and
all the sensing units and all the analog-to-digital converters are driven in the active state under control of the timing generator.

29. The touch sensing system of claim 26, wherein the timing generator is further configured to:
receive an operation mode command from the first controller; and
drive the plurality of groups in a time division manner when the operation mode command indicates an idle state.

30. The touch sensing system of claim 29, wherein:
the timing generator is further configured to:
control power of each of the plurality of sensing units in the idle state; and
generate a plurality of power-down signals indicating a power-down timing of each of the plurality of analog-to-digital converters; and
the plurality of power-down signals are respectively supplied to the sensing units and the analog-to-digital converters.

31. The touch sensing system of claim 30, wherein:
after generating the operation mode command, the first controller is converted to the idle state; and
the first controller turns off a power applied to circuits other than the interrupt receiving circuit.

32. The touch sensing system of claim 31, wherein: the second controller is further configured to:
transmit data received from the first controller to the timing generator,
reads read the touch raw data stored in the buffer memory;
transmit the touch raw data; and
in response to receipt of an operation mode command indicating the idle state, control the clock generator by generating a clock selection signal for selecting the first clock.

33. The touch sensing system of claim 25, wherein the clock generator is further configured to transmit the second clock received from the first controller to the timing generator, the buffer memory, and the second controller in the active state.

34. The touch sensing system of claim 19, wherein each touch sensor of the touch screen comprises a self-capacitance type or a mutual capacitance type.

35. A touch sensitive display device, comprising:
a display driving circuit configured to write data of an input image to pixels of a display panel;
a plurality of sensing units configured to:
sample a voltage received from touch sensors coupled to the display panel; and
accumulate a sampled voltage;
a plurality of analog-to-digital converters configured to convert an output of the sensing units into digital data; and
a touch screen driving circuit configured to drive the sensing units and the analog-to-digital converters on a per group basis in an idle state,
wherein each group comprises:
at least one sensing unit, and
at least one analog-to-digital converter,
wherein only a group that is powered on in the idle state among a plurality of groups outputs touch raw data,
wherein the analog-to-digital converters are powered on, sequentially, on a per group basis,
wherein, when the touch raw data is equal to or greater than a predetermined threshold value, the touch screen driving circuit is converted to an active state, and
wherein the touch screen driving circuit outputs coordinate information of a touch input only in the active state.

36. The touch sensitive display device of claim 35, wherein, when the touch raw data is equal to or greater than the predetermined threshold value, the touch screen driving circuit generates an interrupt signal to be converted to the active state.

37. The touch sensitive display device of claim 35, wherein:
the touch sensors are embedded in the display panel; and
each of the touch sensors comprises a self-capacitance or a mutual capacitance.

38. A touch sensing system, comprising:
a plurality of sensing units configured to:
sample a voltage received from a touch screen; and
accumulate a sampled voltage;
a plurality of analog-to-digital converters configured to convert an output from the sensing units into digital data; and
a touch screen driving circuit configured to drive the sensing units and the analog-to-digital converters on a per group basis in a time division manner,
wherein only a group that is powered on in the idle state outputs touch raw data,
wherein the analog-to-digital converters are powered on, sequentially, on a per group basis,
wherein when the touch raw data is equal to or greater than a predetermined threshold value, the touch screen driving circuit is converted to an active state, and
wherein the touch screen driving circuit outputs coordinate information of a touch input only in the active state.

39. The touch sensing system of claim 38, wherein, when the touch raw data is equal to or greater than the predetermined threshold value, the touch screen driving circuit generates an interrupt signal to be converted to the active state.

40. A touch sensitive display device, comprising:
a display driving circuit configured to write data of an input image to pixels of a display panel;
a plurality of sensing units configured to:
sample a voltage received from touch sensors coupled to the display panel; and
accumulate a sampled voltage;
a plurality of analog-to-digital converters configured to convert an output of the sensing units into digital data; and
a touch screen driving circuit configured to drive the sensing units and the analog-to-digital converters on a per group basis in an idle state,
wherein each group includes:
at least one sensing unit, and
at least one analog-to-digital converter,
wherein only a group that is powered on in the idle state among the plurality of groups outputs touch raw data,
wherein the analog-to-digital converters are powered on, sequentially, on a per group basis,
wherein, when the touch raw data is equal to or greater than a predetermined threshold value, the touch screen driving circuit is converted to an active state, and wherein the touch screen driving circuit outputs coordinate information of a touch input only in the active state.

41. The touch sensitive display of claim 40, wherein, when the touch raw data is equal to or greater than the predetermined threshold value, the touch screen driving circuit generates an interrupt signal to be converted to the active state.

42. A touch sensing system, comprising:
a plurality of sensing units configured to:
sample a voltage received from a touch screen; and
accumulate a sampled voltage; and
a plurality of analog-to-digital converters configured to convert an output of the sensing units into digital data,
wherein the sensing units and the analog-to-digital converters are divided into a plurality of groups and driven in a time division manner,
wherein at least one group including at least one sensing unit and at least one analog-to-digital converter, other than a group that is powered on, is powered down, and
wherein the analog-to-digital converters are powered on, sequentially, on a per group basis.

43. The touch sensing system of claim 42, wherein the at least one sensing unit, in the group that is powered on, is powered down.

44. The touch sensing system of claim 42, wherein the at least one sensing unit, other than the sensing units that is powered down, is powered on.

45. The touch sensing system of claim 44, wherein the at least one analog-to-digital converter, in the group that is powered on, is powered on.

46. A touch sensitive display device, comprising:
a display driving circuit configured to:
apply video data of an input image to pixels of a display panel; and
accumulate a sampled voltage;
a plurality of sensing units configured to:
sample a voltage received from a touch screen; and
accumulate a sampled voltage; and
a plurality of analog-to-digital converters configured to convert an output of the sensing units into digital data,
wherein the sensing units and the analog-to-digital converters are divided into a plurality of groups and driven in a time division manner,
wherein at least one group including at least one sensing unit and at least one analog-to-digital converter other than a group that is powered on is powered down, and
wherein the analog-to-digital converters are powered on, sequentially, on a per group basis.

47. The touch sensitive display device of claim 46, wherein the at least one sensing unit, in the group that is powered on, is powered down.

48. The touch sensitive display device of claim 47, wherein the at least one sensing unit, other than the sensing units that is powered down, is powered on.

49. The touch sensitive display device of claim 48, wherein the at least one analog-to-digital converter, in the group that is powered on, is powered on.

50. The touch sensitive display device of claim 49, wherein:
the touch sensors are embedded in the display panel; and
each of the touch sensors comprises a self-capacitance type or a mutual capacitance type.

* * * * *